US012296397B2

United States Patent
Glanzer et al.

(10) Patent No.: US 12,296,397 B2
(45) Date of Patent: May 13, 2025

(54) MITER SAW

(71) Applicant: MILWAUKEE ELECTRIC TOOL CORPORATION, Brookfield, WI (US)

(72) Inventors: Evan M. Glanzer, Milwaukee, WI (US); Connor P. Sprague, Milwaukee, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 542 days.

(21) Appl. No.: 17/046,495

(22) PCT Filed: Jun. 17, 2020

(86) PCT No.: PCT/US2020/038099
§ 371 (c)(1),
(2) Date: Oct. 9, 2020

(87) PCT Pub. No.: WO2020/257259
PCT Pub. Date: Dec. 24, 2020

(65) Prior Publication Data
US 2022/0395917 A1     Dec. 15, 2022

Related U.S. Application Data

(60) Provisional application No. 62/864,669, filed on Jun. 21, 2019.

(51) Int. Cl.
*B23D 47/02*    (2006.01)
*B23D 45/04*    (2006.01)
*B27B 5/29*    (2006.01)

(52) U.S. Cl.
CPC ......... *B23D 47/025* (2013.01); *B23D 45/048* (2013.01); *B27B 5/29* (2013.01);
(Continued)

(58) Field of Classification Search
CPC ....... B27B 27/04; B27B 5/29; Y10T 83/7788; Y10T 83/7697; Y10T 83/7705;
(Continued)

(56) References Cited

U.S. PATENT DOCUMENTS 1,285,628 A * 11/1918 Salvaryan ............... F16C 29/02
403/381
3,672,251 A * 6/1972 Jagers .................. B23D 45/044
83/490

(Continued)

FOREIGN PATENT DOCUMENTS

| CA | 2372484 A1 | 8/2003 |
|---|---|---|
| CN | 101239407 B | 6/2010 |

(Continued)

OTHER PUBLICATIONS

International Search Report and Written Opinion for Application No. PCT/US2020/038099 dated Sep. 28, 2020 (10 pages).

(Continued)

*Primary Examiner* — Laura M Lee
(74) *Attorney, Agent, or Firm* — Michael Best & Friedrich LLP

(57) ABSTRACT

A miter saw includes a base assembly configured to at least partially support a workpiece on the miter saw. The miter saw also includes a turntable pivotably coupled to the base assembly about a vertical miter axis in a first rotational direction and a second rotational direction opposite the first rotational direction. The turntable is also configured to at least partially support the workpiece on the miter saw. The miter saw also includes a constraining device coupled between the base assembly and the turntable. The constraining device is configured to inhibit movement of the turntable relative to the base assembly in a direction different than the first and second rotational directions.

28 Claims, 9 Drawing Sheets

(52) U.S. Cl.
CPC ........ *Y10T 83/7697* (2015.04); *Y10T 83/7772* (2015.04); *Y10T 83/862* (2015.04)

(58) Field of Classification Search
CPC ... Y10T 83/862; Y10T 83/863; B23D 47/025; B23D 45/048; B23D 45/044
See application file for complete search history.

(56) References Cited

U.S. PATENT DOCUMENTS

| | | | | |
|---|---|---|---|---|
| 4,245,533 | A * | 1/1981 | Batson | B27B 5/206 83/490 |
| 4,265,154 | A * | 5/1981 | Batson | B27B 5/206 269/304 |
| 4,527,453 | A * | 7/1985 | van Hauten | B23D 45/044 83/490 |
| 4,628,782 | A * | 12/1986 | Park | B23D 47/025 83/648 |
| 4,638,700 | A * | 1/1987 | Fushiya | B27B 27/10 83/490 |
| 4,957,024 | A | 9/1990 | Albrecht | |
| 5,063,805 | A * | 11/1991 | Brundage | B23D 45/044 83/490 |
| 5,176,058 | A * | 1/1993 | Skelly | B27B 25/10 83/415 |
| 5,181,448 | A * | 1/1993 | Terpstra | B23D 47/025 83/490 |
| 5,220,857 | A * | 6/1993 | Freeburger | B23D 59/02 83/477.1 |
| 5,297,463 | A | 3/1994 | O'Banion et al. | |
| 5,791,224 | A | 8/1998 | Suzuki et al. | |
| 5,988,031 | A * | 11/1999 | Wixey | B23D 45/048 83/486.1 |
| 6,164,176 | A * | 12/2000 | Larsson | B27B 27/08 83/412 |
| 6,431,042 | B1 | 8/2002 | Brault et al. | |
| 6,561,068 | B2 * | 5/2003 | Meredith | B23D 45/021 83/486.1 |
| 6,691,423 | B2 * | 2/2004 | Fontaine | B23Q 16/06 83/435.14 |
| 8,495,939 | B2 * | 7/2013 | Kani | B27B 27/08 83/490 |
| 9,498,831 | B2 | 11/2016 | Sasaki et al. | |
| 9,908,257 | B2 * | 3/2018 | Eiswerth | B27B 27/06 |
| 2003/0228197 | A1 * | 12/2003 | Salvaryan | B23D 47/04 407/30 |
| 2004/0134323 | A1 * | 7/2004 | Wang | B23D 45/048 83/477.1 |
| 2006/0005677 | A1 * | 1/2006 | Lambert | B27B 5/165 83/471.3 |
| 2008/0053283 | A1 * | 3/2008 | Lin | B27B 27/08 83/440 |
| 2009/0301277 | A1 | 12/2009 | Ipatenco et al. | |
| 2016/0243631 | A1 * | 8/2016 | Brewster | B23D 45/048 |
| 2019/0009425 | A1 | 1/2019 | Sprague | |
| 2019/0314908 | A1 * | 10/2019 | Aoyama | B27B 5/36 |
| 2022/0168828 | A1 * | 6/2022 | Kani | B23D 45/048 |

FOREIGN PATENT DOCUMENTS

| | | | |
|---|---|---|---|
| CN | 206936503 | U | 1/2018 |
| CN | 108015342 | A | 5/2018 |
| CN | 207431406 | U | 6/2018 |
| CN | 211387693 | U * | 9/2020 |
| DE | 3040500 | C2 | 1/1989 |
| EP | 0297488 | A2 | 1/1989 |

OTHER PUBLICATIONS

Hercules, "Owner's Manual & Safety Instructions, Model HE74, 12" Double-Bevel Sliding Compound Miter Saw," publicly available at least as early as May 20, 2019 (16 pages).

Extended European Search Report for Application No. 20827375.5 dated Dec. 12, 2023 (9 pages).

* cited by examiner

MITER SAW

CROSS-REFERENCE TO RELATED APPLICATIONS

This application is a national phase filing under 35 U.S.C. 371 of International Application No. PCT/US2020/038099 filed Jun. 17, 2020, which claims priority to U.S. Provisional Patent Application No. 62/864,669 filed Jun. 21, 2019, the entire contents of which are incorporated herein by reference.

FIELD OF THE DISCLOSURE

The present disclosure relates to power tools, and more particularly to miter saws.

SUMMARY OF THE DISCLOSURE

The disclosure provides, in one aspect, a miter saw including a base assembly configured to at least partially support a workpiece on the miter saw. The miter saw also includes a turntable pivotably coupled to the base assembly about a vertical miter axis in a first rotational direction and a second rotational direction opposite the first rotational direction. The turntable is also configured to at least partially support the workpiece on the miter saw. The miter saw also includes a constraining device coupled between the base assembly and the turntable. The constraining device is configured to inhibit movement of the turntable relative to the base assembly in a direction different than the first and second rotational directions.

The disclosure provides, in one aspect, a miter saw including a base assembly having a base configured to at least partially support a workpiece on the miter saw and a fence subassembly coupled to the base. The miter saw also includes a turntable pivotably coupled to the base about a vertical miter axis in a first rotational direction and a second rotational direction opposite the first rotational direction. The turntable is also configured to at least partially support the workpiece on the miter saw. The miter saw also includes a constraining device coupled between the fence subassembly and the turntable. The constraining device is configured to inhibit movement of the turntable relative to the base assembly in a direction different than the first and second rotational directions.

The disclosure provides, in one aspect, a miter saw including a base assembly configured to at least partially support a workpiece on the miter saw and a turntable pivotably coupled to the base assembly about a vertical miter axis in a first rotational direction and a second rotational direction opposite the first rotational direction. The turntable is also configured to at least partially support the workpiece on the miter saw. The miter saw also includes a constraining device coupled between the base assembly and the turntable. The constraining device is configured to inhibit movement of the turntable relative to the base assembly in a direction different than the first and second rotational directions. The constraining device includes a first spacer coupled to one of the base assembly and the turntable and a first bearing surface formed on the other of the base assembly and the turntable as the first spacer. The first bearing surface is engageable with the first spacer. The constraining device also includes a second spacer remotely located from the first spacer. The second spacer is coupled to one of the base assembly and the turntable. The constraining device further includes a second bearing surface formed on the other of the base assembly and the turntable as the second spacer. The second bearing surface is engageable with the second spacer.

Other features and aspects of the disclosure will become apparent by consideration of the following detailed description and accompanying drawings.

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting. Terms of degree, such as "substantially" or "approximately" are understood by those of ordinary skill to refer to reasonable ranges outside of the given value, for example, general tolerances associated with manufacturing, assembly, and use of the described embodiments.

DETAILED DESCRIPTION

Figure 1:
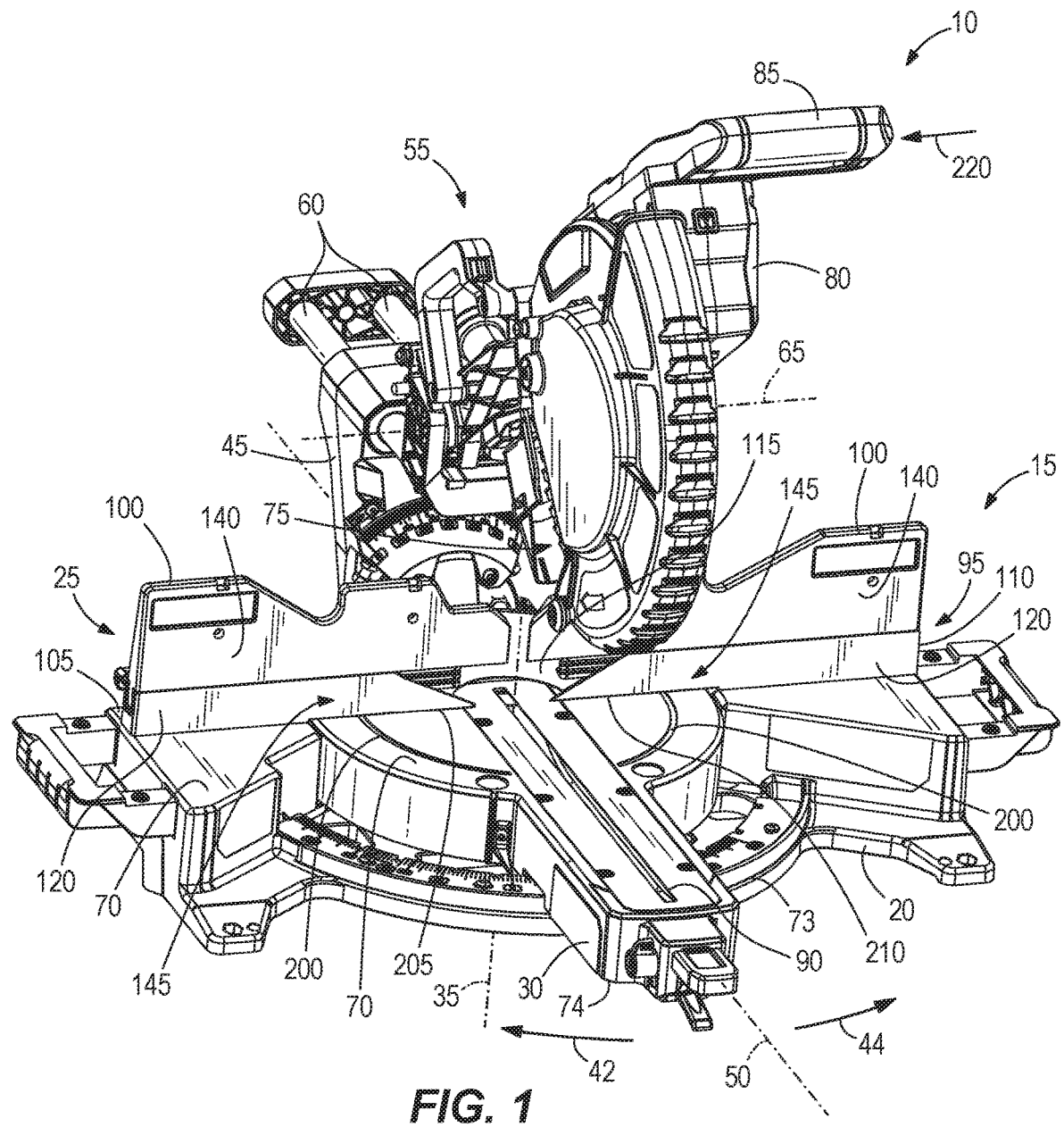
FIG. 1 is a front perspective view of a miter saw including a base assembly and a turntable according to one embodiment of the disclosure.
Figure 3:
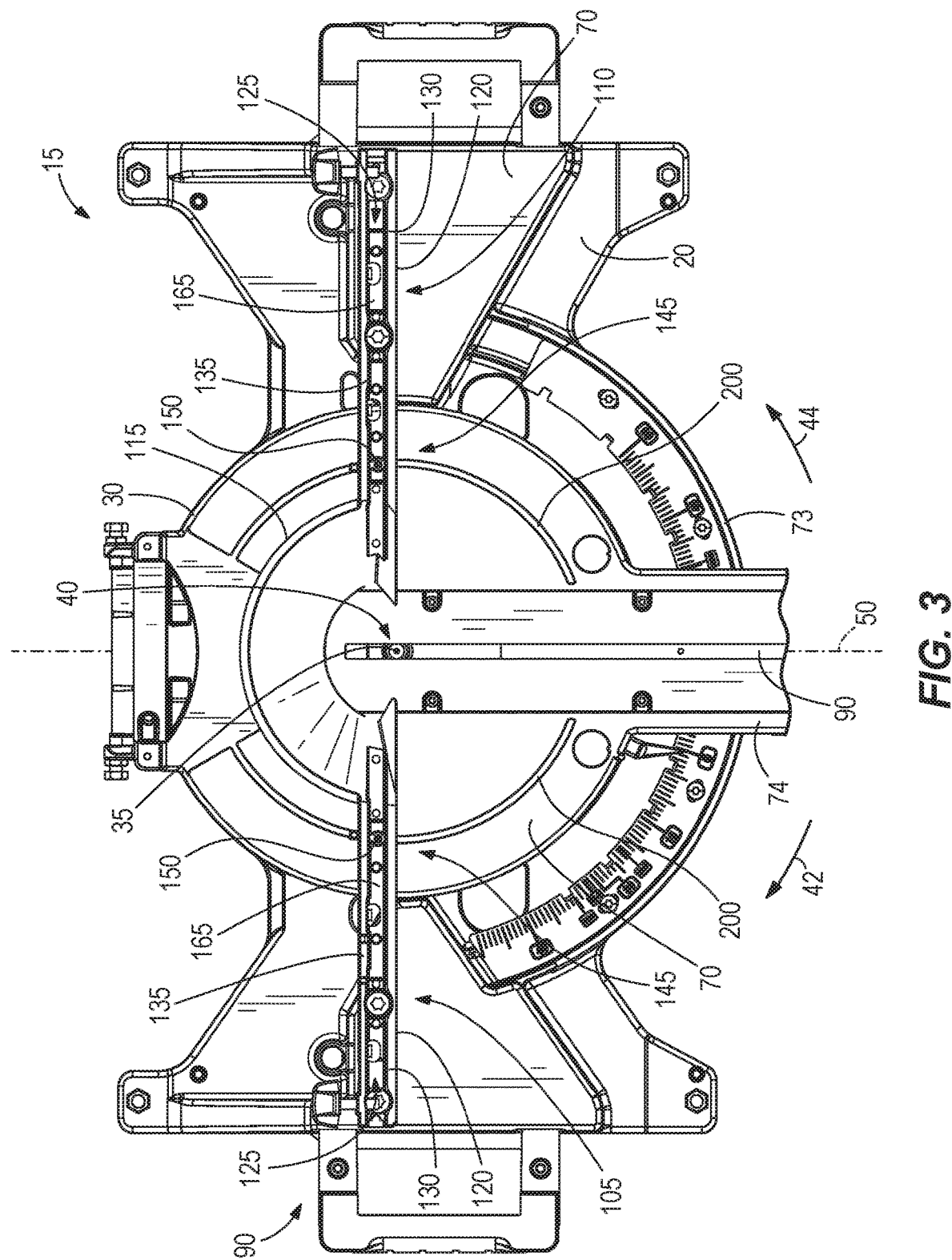
FIG. 3 is a top view of a portion of the miter saw of FIG. 1.

With reference to FIG. 1, a power tool (i.e., a miter saw 10) includes a base assembly 15 having a base 20 and a fence subassembly 25. The miter saw 10 also includes a turntable 30 pivotably coupled to the base 20 about a vertical miter axis 35. In particular, a bearing (e.g., a thrust bearing 40; FIG. 3) is coupled between the base 20 and the turntable 30 concentric with the vertical miter axis 35 to support pivotable movement of the turntable 30 relative to the base 20 in a first rotational direction 42 or a second rotational direction 44. The miter saw 10 also includes a bevel arm 45 pivotably coupled to the turntable 30 about a horizontal bevel axis 50 and a saw unit 55 coupled to the bevel arm 45 by guide rails 60 for movement with the bevel arm 45 about the horizontal bevel axis 50. The guide rails 60 also allow the saw unit 55 to slide in a direction parallel to the horizontal bevel axis 50 (i.e., in a fore-aft direction). In addition, the saw unit 55 is pivotable relative to the bevel arm 45 about a chopping axis 65. The turntable 30 and the base 20 each include a horizontal workpiece support surface 70 (e.g., a top surface) that supports a workpiece on the miter saw 10 such that the miter saw 10 is operable to perform a first angled cut (e.g., a miter cut) on the workpiece and/or a second angled cut (e.g., a bevel cut) on the workpiece.

Figure 2:
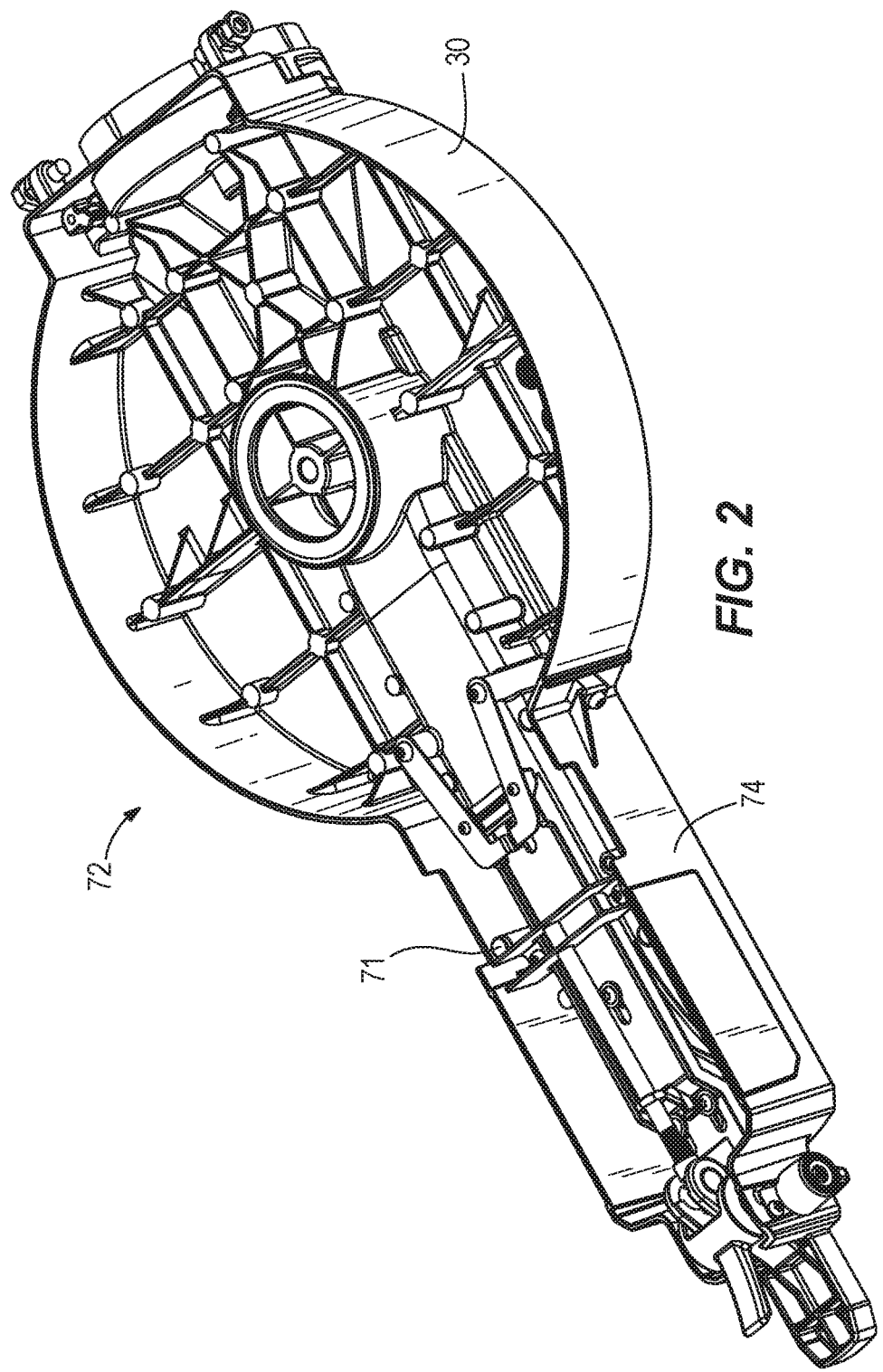
FIG. 2 is a bottom perspective view of the turntable of FIG. 1.

With reference to FIG. 2, the turntable 30 includes a stop or pad 71 fixedly coupled to a bottom side 72 of the turntable 30. The illustrated stop 71 aligns with a front bearing surface 73 (FIG. 1) of the base 20. As such, a force acting on, for example, a front portion (e.g., a tongue 74) of the turntable 30 is absorbed by the base 20 via the stop 71 pressed against the bearing surface 73. As a result, the stop 71 prevents a moment from being applied to the turntable 30 in a direction that is transverse to the miter axis 35 that might otherwise cause the turntable 30 to tilt toward the front of the saw 10, thereby limiting movement of the turntable to a single degree of freedom (i.e., rotation about the miter axis 35). In some embodiments, the bearing surface 73 and/or the stop 71 can be made of a low friction plastic that allows slidable movement of the stop 71 against the bearing surface 73.

With reference back to FIG. 1, the saw unit 55 includes a saw blade 75, a motor housing 80 supporting a motor operable to drive the saw blade 75, and a handle 85. The handle 85 is operable to pivot the saw unit 55 about the chopping axis 65 into a kerf 90 of the turntable 30. The motor of the saw unit 55 is powered by a power tool battery pack. In some embodiments, the motor can be a brushless direct current (i.e., DC) motor, a brushed DC motor, or an alternating current (i.e., AC) motor. In other embodiments of the miter saw 10, the saw unit 55 can include a power cord electrically coupled to the motor to provide power to the motor from a power supply (e.g., a standard electrical outlet).

With continued reference to FIG. 1, the fence subassembly 25 includes a lower fence 95 fixed to the base 20 and two movable fences 100 slidably coupled to the lower fence 95. The illustrated lower fence 95 includes a first fixed fence 105, a second fixed fence 110, and an arcuate member 115 connecting the first and second fixed fences 105, 110 together. Specifically, the first fixed fence 105 is positioned on a first side of the vertical miter axis 35, the second fixed fence 110 is positioned on a second side of the vertical miter axis 35, and the arcuate member 115 extends around the vertical miter axis 35. Each fixed fence 105, 110 includes a first vertical workpiece support surface 120 that cooperates with the horizontal workpiece support surfaces 70 to support and position the workpiece on the miter saw 10. With reference to FIG. 3, the first and second fixed fences 105, 110 each include a channel 125 formed by a front wall 130 and a rear wall 135 of the first and second fixed fences 105, 110. Each channel 125 receives a portion of one movable fence 100 to allow slidable movement of the movable fences 100 relative to the lower fence 95. Moreover, the movable fences 100 are independently slidable in a direction transverse to the vertical miter axis 35, independently lockable to the corresponding first and second fixed fences 105, 110, and independently removable from the corresponding first and second fixed fences 105, 110. In addition, the movable fences 100 each include a second vertical workpiece support surface 140 (FIG. 1) that cooperates with the first vertical workpiece support surfaces 120 and the horizontal workpiece support surfaces 70 to support and position the workpiece on the miter saw 10.

Figure 4:
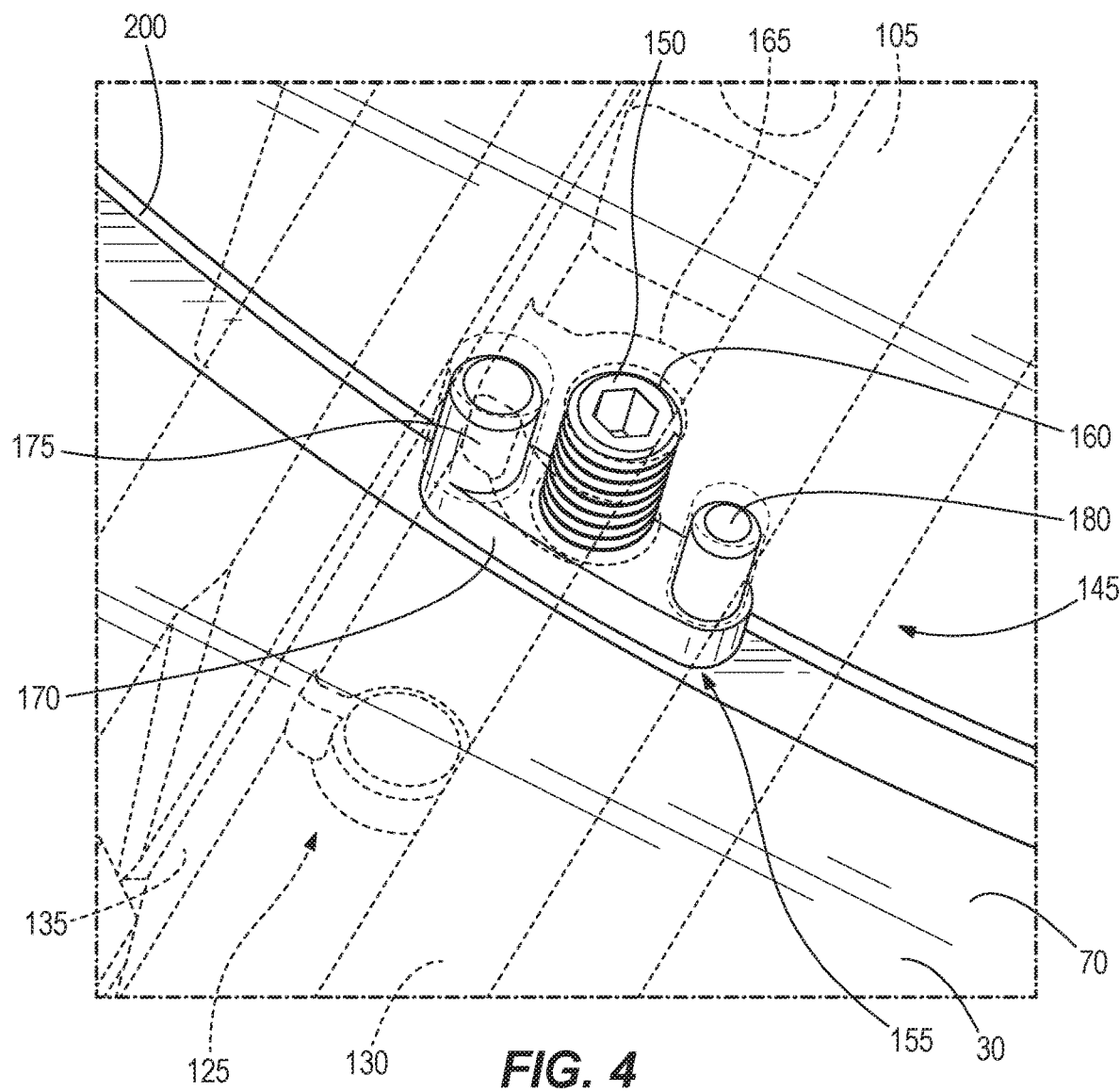
FIG. 4 is a top perspective view of a portion of the miter saw of FIG. 1, illustrating an anti-wobble device coupled between a fence subassembly of the base assembly and the turntable.
Figure 6:
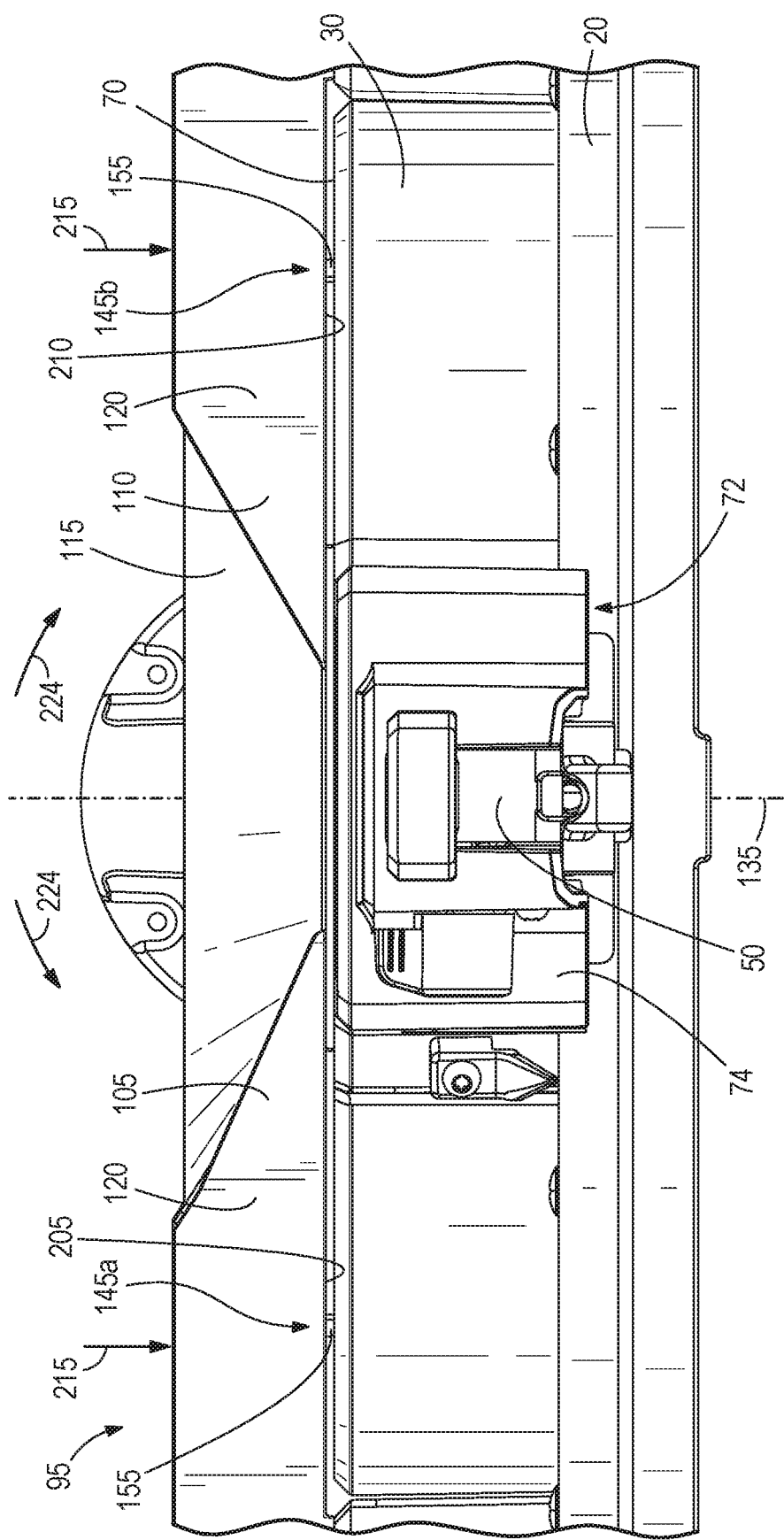
FIG. 6 is a front view of a portion of the miter saw of FIG. 1, illustrating two anti-wobble devices coupled between the fence subassembly and the turntable.

The illustrated miter saw 10 also includes anti-wobble devices or constraining devices 145 (one is shown in FIG. 4) coupled between the base assembly 15 and the turntable 30. In particular, a first anti-wobble device 145*a* is coupled between the turntable 30 and the first fixed fence 105 and a second anti-wobble device 145*b* is coupled between the turntable 30 and the second fixed fence 110 (FIG. 6). The anti-wobble devices 145 are substantially the same, and as such, one anti-wobble device 145 is discussed in detail below, but features and components of one anti-wobble device 145 are equally applicable to the other anti-wobble device 145. In other embodiments of the miter saw 10, only one anti-wobble device 145 can be coupled between the base assembly 15 and the turntable 30 or more than two anti-wobble devices 145 can be coupled between the base assembly 15 and the turntable 30. For example, a third anti-wobble device 145 can be coupled between the arcuate member 115 of the lower fence 95 and the turntable 30.

Figure 5:
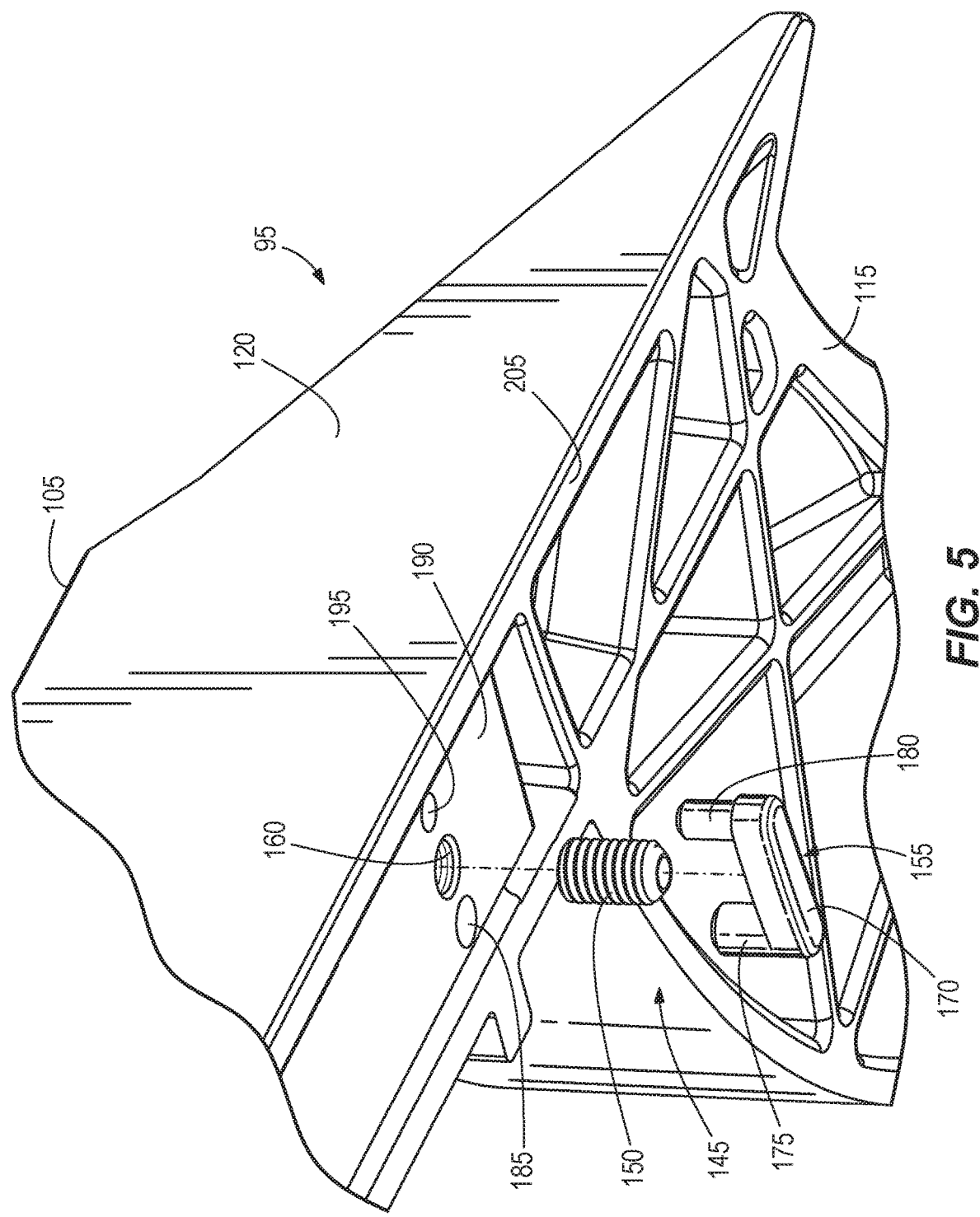
FIG. 5 is a bottom perspective view of a portion of the fence subassembly of FIG. 4, illustrating the anti-wobble device exploded from the fence subassembly.

As shown in FIG. 4, the anti-wobble device 145 includes an adjustment member (e.g., a set screw 150) and an engagement member (e.g., a spacer 155). The set screw 150 is received within a through aperture 160 formed in a bottom surface 165 of the channel 125, and in the illustrated embodiment, the aperture 160 is a threaded aperture. The illustrated spacer 155 includes a curved body 170, a first protrusion 175 extending from the body 170, and a second protrusion 180 also extending from the body 170. With reference to FIG. 5, the first protrusion 175 is sized to be received within a first bore 185 formed in a recessed bottom surface 190 of the lower fence 95, and the second protrusion 180 is sized to be received within a second bore 195 in the recessed bottom surface 190. The first and second protrusions 175, 180 are operable to locate the curved body 170 relative to the lower fence 95 such that a portion of the curved body 170 is received within a curved groove 200 (e.g., a bearing surface) of the horizontal workpiece support surface 70 of the turntable 30 (FIG. 4). With reference back to FIG. 3, each curved groove 200 includes an arc length of at least 90 degrees, and in some embodiments about 130 degrees, and the grooves 200 are separated by the kerf 90 adjacent the front portion of the turntable 30. In other embodiments, the grooves 200 may be omitted. With reference to FIGS. 4 and 5, the protrusions 175, 180 are sized differently to ensure the curved body 170 is properly oriented relative to the first fixed fence 105 such that the curvature of the body 170 aligns with the curvature of the groove 200. In particular, the first protrusion 175 is a cylindrical protrusion including a greater diameter than the second protrusion 180 that is also a cylindrical protrusion. As such, the first protrusion 175 can only be properly received within the larger, first bore 185 to ensure proper orientation of the curved body 170 (e.g., a single orientation relative to the lower fence 95). In other embodiments of the miter saw 10, the protrusions 175, 180 can be differently shaped (e.g., one or both of the protrusions 175, 180 can be cuboid protrusions, one or both of the protrusions 175, 180, can be triangular prism protrusions, etc.). Furthermore, the spacer 155 is made of a low friction plastic or another material that includes a hardness less than a hardness of the turntable 30.

With reference to FIG. 6, a portion of the curved body 170 of the first anti-wobble device 145*a* extends below a bottom edge 205 of the first fixed fence 105 (in a direction parallel to the vertical miter axis 35) to engage the corresponding groove 200, and a portion of the curved body 170 of the second anti-wobble device 145*b* extends below a bottom edge 210 of the second fixed fence 110 (in the direction parallel to the vertical miter axis 35) to also engage the corresponding groove 200. A downward clamping force 215 created by engagement of the first and second anti-wobble devices 145 with the turntable 30 is controlled by the corresponding set screws 150. In order to adjust the clamping force 215, the movable fences 100 are moved within the corresponding channel 125 to expose the set screws 150. Then, by actuating the set screw 150 of the first anti-wobble device 145a downwardly into the first fixed fence 105, the set screw 150 engages the first spacer 155 to push the first spacer 155 downwardly toward the turntable 30. In contrast, by actuating the set screw 150 of the first anti-wobble device 145a upwardly away from the turntable 30, the clamping force applied to the first spacer 155 decreases. Likewise, by actuating the set screw 150 of the second anti-wobble device 145b downwardly into the second fixed fence 110, the set screw 150 engages the second spacer 155 to push the spacer 155 downwardly toward the turntable 30, and by actuating the set screw 150 of the second anti-wobble device 145b upwardly away from the turntable 30, the clamping force applied to the second spacer 155 decreases.

As described above, the thrust bearing 40 between the turntable 30 and the base 20 allows for pivotable movement of the turntable 30 in the first and second rotational directions 42, 44. However, the construction (e.g., material, strength, internal tolerances, etc.) of the thrust bearing 40 may allow the turntable 30 to undesirably move (e.g., wobble about an axis that is transverse to the vertical miter axis 35, which hereinafter will be referred to as "wobbling about the vertical miter axis 35") relative to the base 20. For example, a horizontal force 220 (FIG. 1) applied to the handle 85 of the saw unit 55 while the miter saw 10 is locked about the vertical miter axis 35 and the horizontal bevel axis 50 may cause the turntable 30 to wobble about the vertical miter axis 35. Wobble movement of the turntable 30 can be side-to-side movement of the turntable 30 relative to the base 20 in a direction different than the first and second rotational directions 42, 44 (e.g., pivoting movement of the turntable 30 in either direction 224 within a plane perpendicular to the horizontal bevel axis 50; FIG. 6). Such undesirable movement of the turntable 30 could, for example, produce inaccuracies in the miter angle cut and/or the bevel angle cut on the workpiece.

Accordingly, the anti-wobble devices 145 inhibit this undesirable movement of the turntable 30. The downward clamping force 215 of each anti-wobble device 145 creates a force balance on the turntable 30 that eliminates any potential wobble of the turntable 30. Stated another away, the first anti-wobble device 145a contacts the turntable 30 at a first discrete location on one side of the vertical miter axis 35 and the second anti-wobble device 145b contacts the turntable 30 at a second discrete location on the other side of the vertical miter axis 35 to stabilize the turntable 30 from wobbling about the vertical miter axis 35. Moreover, the stop 71 on the bottom side 72 of the turntable 30 contacts the base 20 at a third discrete location to further stabilize the turntable 30 from wobbling forward.

Furthermore, the spacers 155 slide within the corresponding curved groove 200 as the turntable 30 pivots about the vertical miter axis 35 into a desired miter angle. This sliding movement can produce wear on the curved bodies 170 of the anti-wobble devices 145. Accordingly, each anti-wobble device 145 is adjustable by the set screws 150 to account for wear over time to maintain the stability of the turntable 30 relative to the base 20. For example, the set screws 150 are actuated to move the spacers 155 toward the turntable 30 as the bodies 170 wear down over time. The anti-wobble devices 145 can also be adjusted to ensure the horizontal workpiece support surface 70 of the turntable 30 is substantially parallel to the horizontal workpiece support surface 70 of the base 20. Due to wear, the spacers 155 are also replaceable by removing the fence subassembly 25 from the base 20, removing the worn spacers 155 from the lower fence 95, inserting new spacers 155 into the lower fence 95, and recoupling the fence subassembly 25 onto the base 20.

Figure 7:
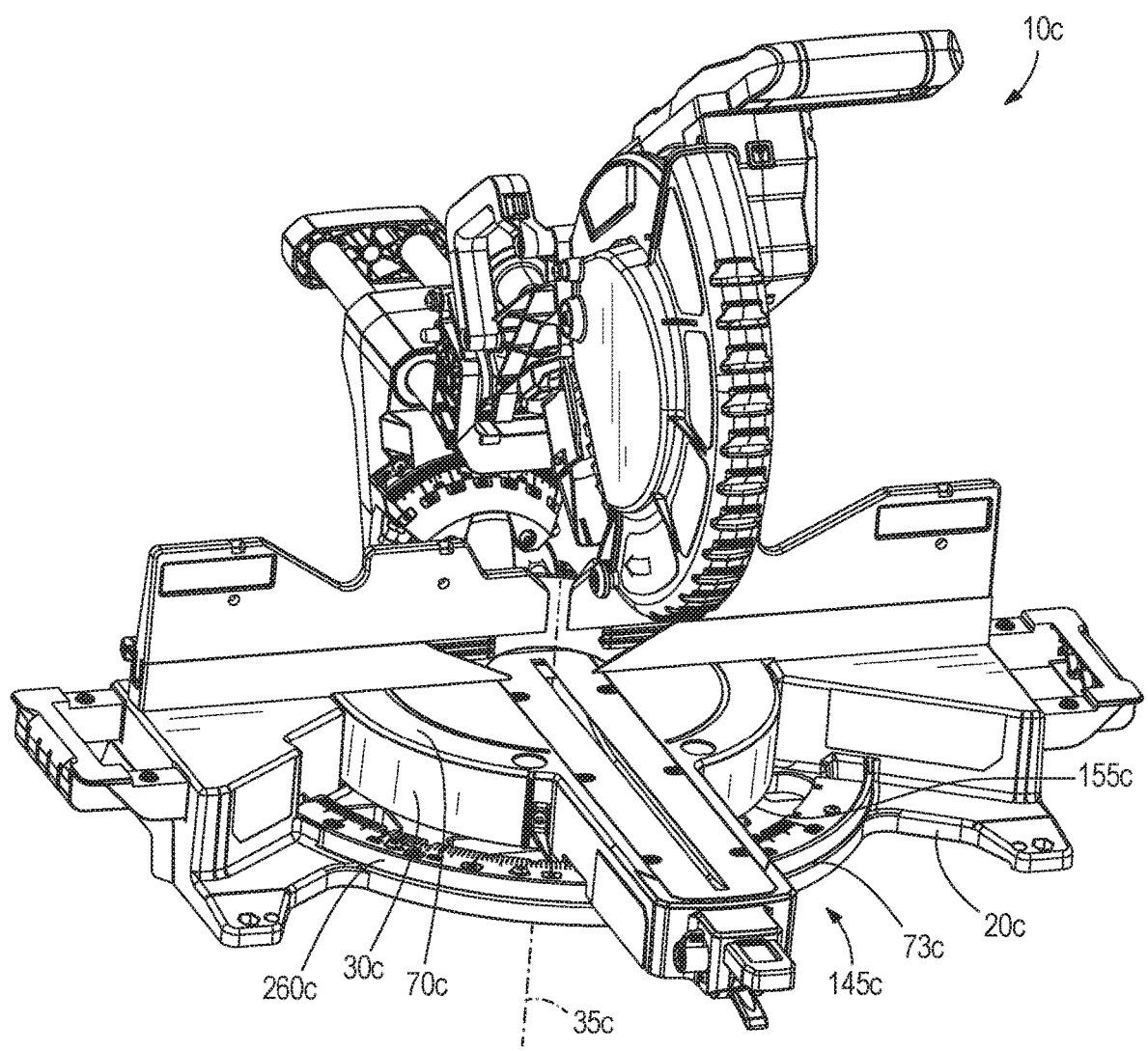
FIG. 7 is a front perspective view of a miter saw including a base assembly and a turntable according to another embodiment of the disclosure.
Figure 8:
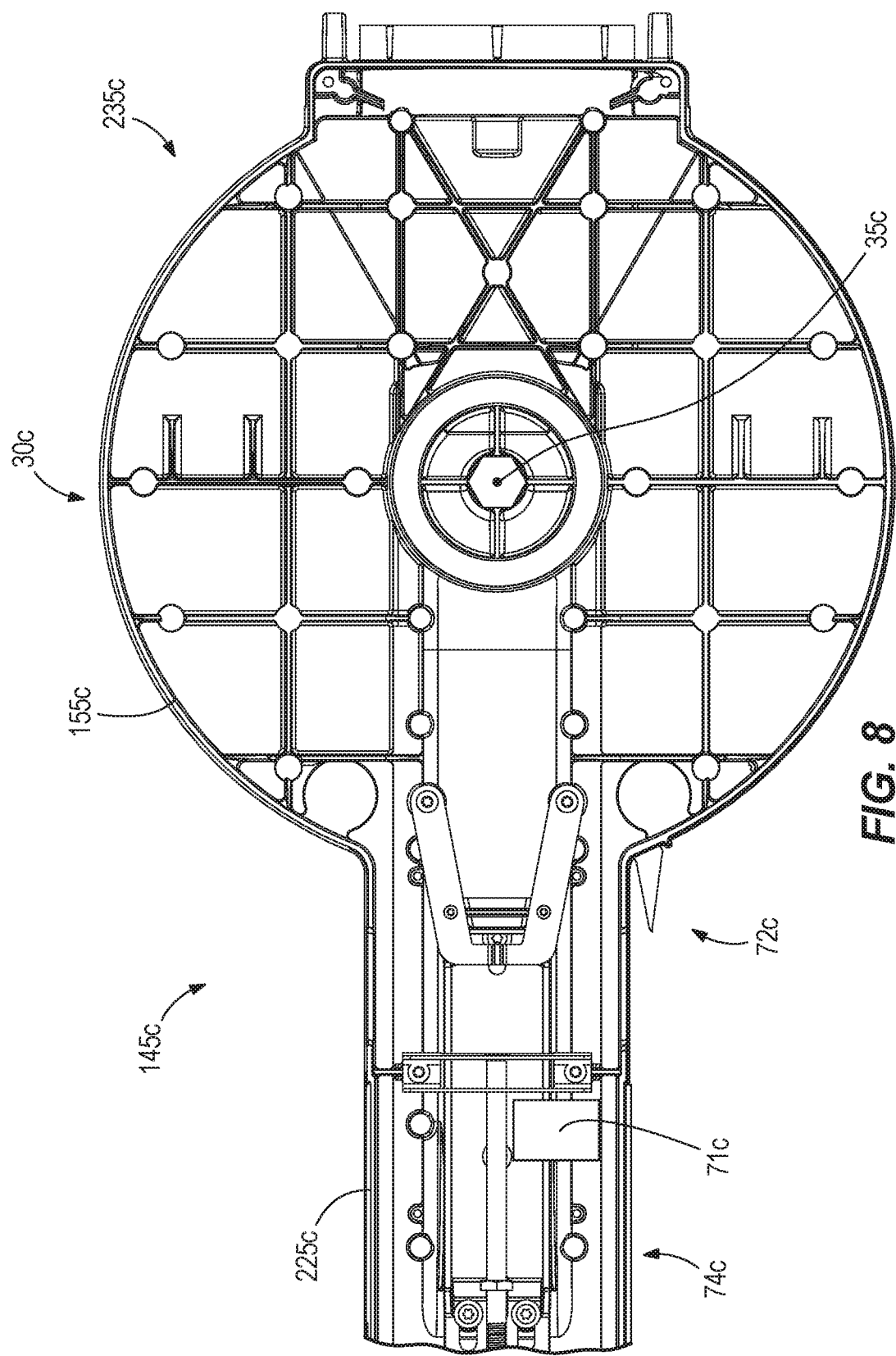
FIG. 8 is a bottom view of the turntable of FIG. 7, illustrating a portion of anti-wobble devices coupled to the turntable.
Figure 9:
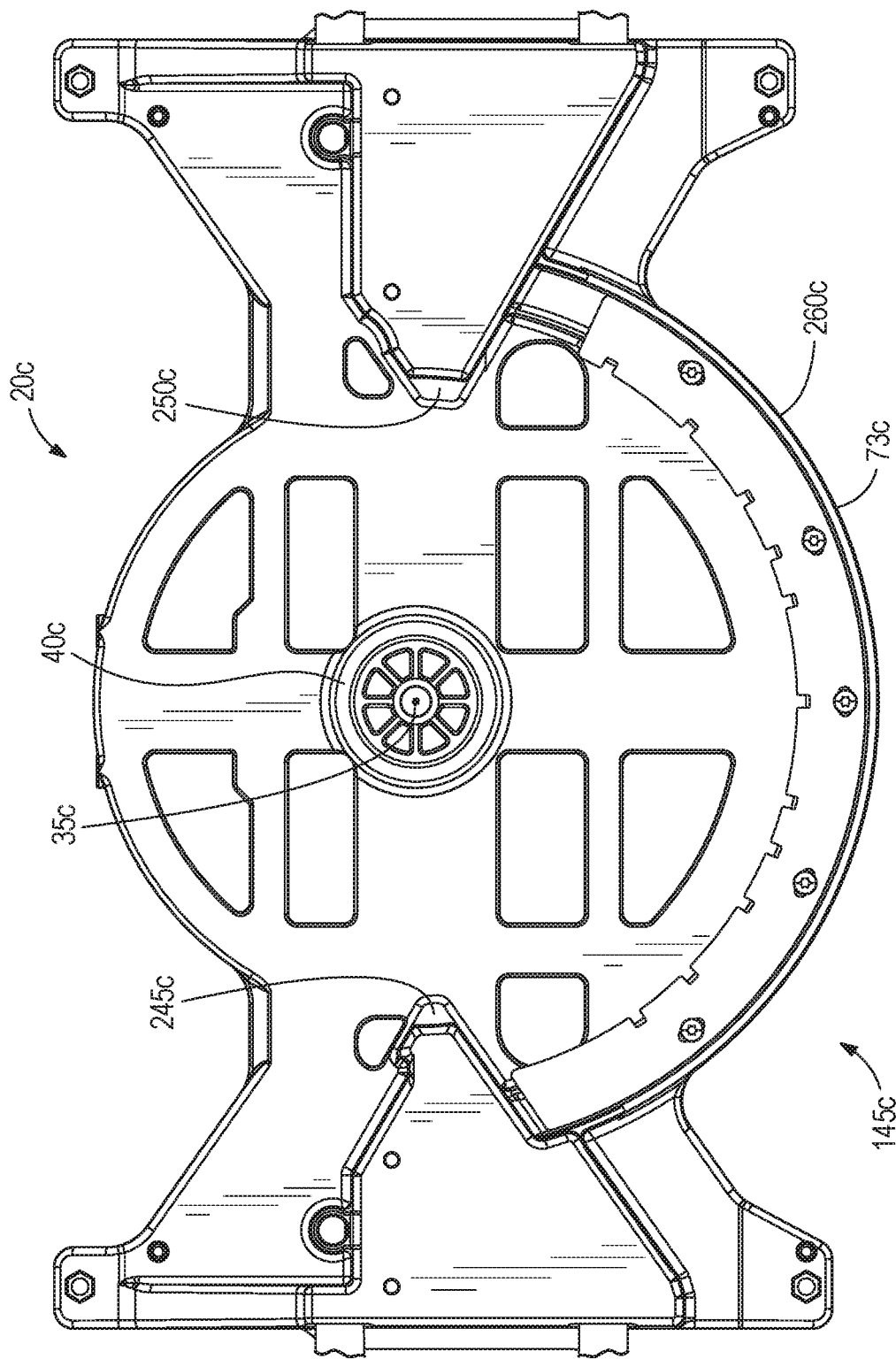
FIG. 9 is a top view of the base assembly of FIG. 7, illustrating another portion of the anti-wobble devices coupled to the base assembly.

FIGS. 7-9 illustrate a miter saw 10c according to another embodiment. The miter saw 10c is similar to the miter saw 10 as shown in FIG. 1; therefore, like features are designated with like references numerals plus the letter "c." At least some differences and/or at least some similarities between the miter saws 10, 10c will be discussed in detail below. In addition, components or features described with respect to the miter saw 10c are equally applicable to the miter saw 10.

As shown in FIG. 7, the miter saw 10c includes a turntable 30c pivotably coupled to a base 20c about a vertical miter axis 35c. In particular, a thrust bearing 40c (FIG. 9) enables pivotable movement of the turntable 30c relative to the base 20c. Anti-wobble devices 145c are positioned between the turntable 30c and the base 20c to inhibit the turntable 30c from wobbling about the vertical miter axis 35c relative to the base 20c.

The illustrated turntable 30c includes a horizontal workpiece support surface 70c (FIG. 7) and a peripheral bottom edge 225c (FIG. 8) positioned opposite the horizontal workpiece support surface 70c on a bottom side 72c of the turntable 30c. The turntable 30c includes a portion of the anti-wobble devices 145c having a first spacer 155c and a second spacer 71c. The first spacer 155c is formed as a strip of material coupled to at least a portion of the peripheral bottom edge 225c. In the illustrated embodiment, the first spacer 155c is positioned around a cylindrical portion 235c of the turntable 30c. The second spacer 71c is formed as a pad or block of material coupled to a tongue 74c of the turntable 30a and extends below the peripheral bottom edge 225c. The first and second spacers 155c, 71c are made of a low friction plastic material.

With reference to FIG. 9, the base 20c includes the remaining portions of the anti-wobble devices 145c having a first bearing surface 245c, a second bearing surface 250c, and a third bearing surface 73c. The first and second bearing surfaces 245c, 250c are generally positioned radially opposite from each other relative to the vertical miter axis 35c, and the third bearing surface 73c is positioned along a front curved edge 260c of the base 20c. The first, second, and third bearing surfaces 245c, 250c, 73c are made of a low friction plastic material similar to the plastic material of the first and second spacers 155c, 71c.

When the miter saw 10c is assembled, the first spacer 155c of the turntable 30c engages the first and second bearing surfaces 245c, 250c of the base 20c, and the second spacer 71c of the turntable 30c engages the third bearing surface 73c of the base 20c. Accordingly, the anti-wobble devices 145c are compressed between the turntable 30c and the base 20c during assembly of the miter saw 10c to inhibit the turntable 30c from wobbling about the vertical miter axis 35c relative to the base 20c. Furthermore, during operation of the miter saw 10c, the spacers 155c, 71c of the turntable 30c slide on the bearing surfaces 245c, 250c, 73c of the base 20c, and as such, a low friction material of the spacers 155c, 71c and the bearing surfaces 245c, 250c, 73c is desired to allow unrestricted pivoting movement of the turntable 30c about the vertical miter axis 35c. In other embodiments of the miter saw 10c, the spacers 155c, 71c can be coupled to the base 20c and the bearing surfaces 245c, 250c, 73c can be coupled to the turntable 30c.

Although the disclosure has been described in detail with reference to certain preferred embodiments, variations and modifications exist within the scope and spirit of one or more independent aspects of the disclosure as described. Various features and advantages of the disclosure are set forth in the following claims.

The invention claimed is:

1. A miter saw comprising:
a base assembly configured to at least partially support a workpiece on the miter saw, the base assembly including a fence subassembly, the fence subassembly having a through aperture, and further having a bore that is parallel with the through aperture formed in a surface of the fence subassembly;
a turntable pivotably coupled to the base assembly about a vertical miter axis in a first rotational direction and a second rotational direction opposite the first rotational direction, the turntable having a top surface configured to at least partially support the workpiece on the miter saw; and
a constraining device including a spacer coupled to an adjustment member, the spacer having a body from which a protrusion extends, the adjustment member disposed in the through aperture and having an engagement end that is actuatable, wherein the adjustment member is movable relative to the spacer, and wherein actuation of the engagement end moves the spacer to contact the top surface to inhibit movement of the turntable relative to the base assembly in a direction different than the first and second rotational directions, wherein the protrusion is received in the bore.

2. The miter saw of claim 1, wherein the base assembly includes a base to which the turntable is pivotably coupled, wherein the fence subassembly is coupled to the base, and wherein the constraining device is coupled between the fence subassembly and the turntable.

3. The miter saw of claim 2, wherein the fence subassembly includes a fixed fence coupled to the base, and wherein the constraining device is coupled between the fixed fence and the turntable.

4. The miter saw of claim 3, wherein the adjustment member is coupled to the fixed fence, and wherein the adjustment member is configured to apply a downward force against the spacer to push the spacer against the turntable.

5. The miter saw of claim 4, wherein the adjustment member is adjustable to vary the downward force.

6. The miter saw of claim 4, wherein the spacer is coupled to the fixed fence in only one orientation.

7. The miter saw of claim 4, wherein the spacer is selectively removable from the fixed fence.

8. The miter saw of claim 2, wherein the spacer is a first spacer coupled between a first fixed fence of the fence subassembly and the turntable, wherein the constraining device includes a second spacer coupled between a second fixed fence of the fence subassembly and the turntable, and wherein the first and second spacers contact the turntable at two discrete locations.

9. The miter saw of claim 8, wherein the two discrete locations are positioned on opposite sides of the vertical miter axis.

10. The miter saw of claim 8, wherein the first and second spacers are engageable with the top surface of the turntable.

11. The miter saw of claim 2, wherein the turntable includes a stop fixed to a bottom side of the turntable, and wherein the stop is engageable with a bearing surface of the base.

12. The miter saw of claim 2, wherein the fence subassembly includes a first fence fixedly coupled to the base and a movable fence coupled to the first fence, wherein movement of the movable fence relative to the first fence exposes the adjustment member of the constraining device to adjust the constraining device.

13. The miter saw of claim 12, wherein the adjustment member is configured as a setscrew, the setscrew including the engagement end that is exposed when the movable fence is moved relative to the first fence.

14. The miter saw of claim 1, wherein the bore is a first bore and the protrusion is a first protrusion, wherein the fence subassembly has a second bore, wherein the spacer has a second protrusion extending from the body, wherein the first protrusion is received in the first bore, and wherein the second protrusion is received in the second bore.

15. A miter saw comprising:
a base assembly including
a base configured to at least partially support a workpiece on the miter saw, and
a fence subassembly coupled to the base, the fence subassembly having a through aperture, and a bore that is parallel with the through aperture formed in a surface of the fence subassembly;
a turntable pivotably coupled to the base about a vertical miter axis in a first rotational direction and a second rotational direction opposite the first rotational direction, the turntable having a top surface configured to at least partially support the workpiece on the miter saw; and
a constraining device including a spacer coupled to an adjustment member, the spacer including a body from which a protrusion extends, the adjustment member supported in the through aperture and including an engagement end that is actuatable, wherein the adjustment member is movable relative to the spacer, and wherein actuation of the engagement end moves the spacer to contact the top surface to inhibit movement of the turntable relative to the base assembly in a direction different than the first and second rotational directions, wherein the protrusion is received in the bore.

16. The miter saw of claim 15, wherein the fence subassembly includes a fixed fence coupled to the base, and wherein the constraining device is coupled between the fixed fence and the turntable.

17. The miter saw of claim 16, wherein the adjustment member is coupled to the fixed fence, and wherein the adjustment member is configured to apply a downward force against the spacer to push the spacer against the turntable.

18. The miter saw of claim 17, wherein the adjustment member is adjustable to vary the downward force.

19. The miter saw of claim 17, wherein the spacer is coupled to the fixed fence in only one orientation.

20. The miter saw of claim 17, wherein the spacer is selectively removable from the fixed fence.

21. The miter saw of claim 15, wherein the spacer is a first spacer coupled between a first fixed fence of the fence subassembly and the turntable, wherein the constraining device includes a second spacer coupled between a second fixed fence of the fence subassembly and the turntable, and wherein the first and second spacers contact the turntable at two discrete locations.

22. The miter saw of claim 21, wherein the two discrete locations are positioned on opposite sides of the vertical miter axis.

23. The miter saw of claim 21, wherein the first and second spacers are engageable with the top surface of the turntable.

24. The miter saw of claim 15, wherein the turntable includes a stop fixed to a bottom side of the turntable, and wherein the stop is engageable with a bearing surface of the base.

25. The miter saw of claim 15, wherein the fence subassembly includes a first fence fixedly coupled to the base and a movable fence coupled to the first fence, wherein movement of the movable fence relative to the first fence exposes the adjustment member of the constraining device to adjust the constraining device.

26. The miter saw of claim 25, wherein the adjustment member is configured as a setscrew, the setscrew including the engagement end that is exposed when the movable fence is moved relative to the first fence.

27. The miter saw of claim 15, wherein the bore is a first bore and the protrusion is a first protrusion, wherein the fence subassembly has a second bore, wherein the spacer has a second protrusion extending from the body, wherein the first protrusion is received in the first bore, and wherein the second protrusion is received in the second bore.

28. A miter saw comprising:
a base assembly configured to at least partially support a workpiece on the miter saw, the base assembly including a fence subassembly, the fence subassembly having a through aperture, and further having a first bore and a second bore formed in a surface of the fence subassembly;
a turntable pivotably coupled to the base assembly about a vertical miter axis in a first rotational direction and a second rotational direction opposite the first rotational direction, the turntable having a top surface configured to at least partially support the workpiece on the miter saw; and
a constraining device including a spacer coupled to an adjustment member, the spacer having a body from which a first protrusion and a second protrusion extends, the adjustment member disposed in the through aperture and having an engagement end that is actuatable, wherein the adjustment member is movable relative to the spacer, and wherein actuation of the engagement end moves the spacer to contact the top surface to inhibit movement of the turntable relative to the base assembly in a direction different than the first and second rotational directions,
wherein the first protrusion is received in the first bore and the second protrusion is received in the second bore.

\* \* \* \* \*